US010377435B2

(12) United States Patent
Montague (10) Patent No.: US 10,377,435 B2
(45) Date of Patent: Aug. 13, 2019

(54) MULTI-FUNCTION BICYCLE CARGO RACK AND STAND COMPONENT

(71) Applicant: Montague Corporation, Cambridge, MA (US)

(72) Inventor: David Montague, Newton, MA (US)

(73) Assignee: Montague Corporation, Cambridge, MA (US)

( * ) Notice: Subject to any disclaimer, the term of this patent is extended or adjusted under 35 U.S.C. 154(b) by 696 days.

(21) Appl. No.: 14/805,686

(22) Filed: Jul. 22, 2015

(65) Prior Publication Data

US 2017/0021885 A1     Jan. 26, 2017

(51) Int. Cl.
| | |
|---|---|
| *B62J 7/04* | (2006.01) |
| *B62H 1/04* | (2006.01) |
| *B62J 23/00* | (2006.01) |
| *B62K 15/00* | (2006.01) |
| *B62J 15/02* | (2006.01) |
| *B62K 25/02* | (2006.01) |

(52) U.S. Cl.
CPC .................. *B62J 7/04* (2013.01); *B62H 1/04* (2013.01); *B62J 15/02* (2013.01); *B62J 23/00* (2013.01); *B62K 15/006* (2013.01); *B62K 2015/001* (2013.01); *B62K 2025/025* (2013.01)

(58) Field of Classification Search
CPC ... B62J 7/04; B62J 15/02; B62J 23/00; B62H 1/04; B62K 15/006
USPC ........ 280/202, 293, 298, 287, 278; 224/432, 224/444
See application file for complete search history.

(56) References Cited

U.S. PATENT DOCUMENTS

| 581,550 | A | * | 4/1897 | Goldsmith | ............... | B62H 1/00 |
| | | | | | | 280/302 |
| 2,534,967 | A | * | 12/1950 | Hapman | ................ | A63B 69/16 |
| | | | | | | 280/288.4 |

(Continued)

FOREIGN PATENT DOCUMENTS

| CA | 2297609 A1 | 8/2001 |
| CN | 2883130 Y | 3/2007 |

(Continued)

OTHER PUBLICATIONS

International Search Report and Written Opinion, issued by International Searching Authority in corresponding International Application No. PCT/US2016/042428, dated Dec. 5, 2016.

(Continued)

*Primary Examiner* — Jacob D Knutson
(74) *Attorney, Agent, or Firm* — Sughrue Mion, PLLC (57) ABSTRACT

A multi-function bicycle component which fastens to a bicycle and which is rotatable relative to the bicycle frame to multiple positions to serve as a cargo rack or luggage carrier in a first position and a bicycle stand or kickstand in a second position. The multi-function bicycle component rotates at or near the wheel axis and comprises a rotation preventing assembly which fastens the multi-function bicycle component relative to the bicycle frame in a riding position. When used in conjunction with a folding bike, the multi-function bicycle component also serves as a stand to assist during the folding process, and/or as a stand when the bicycle is in the folded position. The multi-function bicycle component may also include a bicycle fender.

15 Claims, 8 Drawing Sheets

(56) References Cited

U.S. PATENT DOCUMENTS

| | | | | |
|---|---|---|---|---|
| 3,572,758 A | * | 3/1971 | Lee | A63B 69/16 224/416 |
| 3,854,755 A | * | 12/1974 | Tang | B62K 15/00 280/278 |
| 4,182,522 A | * | 1/1980 | Ritchie | B62K 15/008 280/278 |
| 4,402,439 A | | 9/1983 | Brown | |
| 5,417,629 A | * | 5/1995 | Phipps | B62H 1/04 211/22 |
| 5,472,392 A | | 12/1995 | Haan et al. | |
| 6,336,649 B1 | * | 1/2002 | Lin | B62H 1/02 224/418 |
| 7,175,192 B1 | * | 2/2007 | Lu | B62J 7/04 224/418 |
| 7,341,270 B1 | * | 3/2008 | Scholz | B62J 7/04 224/432 |
| 2001/0004150 A1 | * | 6/2001 | Murayama | B62H 1/02 280/287 |
| 2003/0071439 A1 | * | 4/2003 | Haugen | B62H 1/04 280/293 |
| 2007/0235979 A1 | * | 10/2007 | Lin | B62H 1/04 280/293 |
| 2010/0224662 A1 | * | 9/2010 | Crum, Jr. | B62J 7/04 224/419 |
| 2011/0278912 A1 | * | 11/2011 | Schlanger | B62K 25/02 301/124.2 |

FOREIGN PATENT DOCUMENTS

| | | | | |
|---|---|---|---|---|
| CN | 101784436 A | | 7/2010 | |
| GB | 2310180 B | | 7/2000 | |
| GB | 2388555 A | * | 11/2003 | A63B 69/16 |
| WO | 03095037 A1 | | 11/2003 | |
| WO | 2014/075171 A1 | | 5/2014 | |

OTHER PUBLICATIONS

Communication dated Dec. 13, 2018 from the State Intellectual Property Office of the People's Republic of China in application No. 201680041838.2.

* cited by examiner

MULTI-FUNCTION BICYCLE CARGO RACK AND STAND COMPONENT

BACKGROUND

1. Field of the Invention

This invention relates to a bicycle component which serves more than one purpose. More specifically the present invention relates to a multi-function bicycle component which serves as a cargo rack in one position and a bicycle parking stand another position. When used with folding bikes, it can also serve as a stand to assist during the folding process and as a stand when the bike is in the folded position. The bicycle component may also include a fender.

2. Background Information

Bicycles are often fitted with a variety of components (also referred to as accessories) which enhance their utility. For example, bicycles are parked regularly, and a convenient configuration for parking is upright. However, due to the design, a bicycle does not stand upright without some form of support or stand. Thus a standard kickstand which holds the bicycle in a generally vertical position is often found on bicycles. A cargo rack (also referred to as a luggage carrier) is another component that is commonly found on bicycles. Riders often desire to bring items with them, and a cargo rack has proven to be a convenient off-body method of transporting such items. Finally, fenders (also referred to as mudguards) are commonly fitted on bicycles to keep the rider clean and dry during inclement weather. Fenders require a mounting assembly which can often be in a similar location to supporting members of a cargo rack.

Weight on a bicycle is extremely important. Therefore adding a kickstand, a cargo rack, and fenders, while very useful for their respective functions, can be detrimental to the weight of the bicycle. It would therefore be advantageous to combine the utility of two or more of these components in order to gain the functionality of the component, while not gaining as much in weight.

An attempt to combine a bicycle luggage carrier with a kickstand was made by Phipps (U.S. Pat. No. 5,417,629) who sets forth a swinging member threaded to a solid axle of a wheel hub. However, the Phipps system is not compatible with a hollow axle quick release mechanism, often found on today's bicycles. Furthermore Phipps' attempt to fasten the luggage carrier in the operable riding position using a pin through the axle area, about which the assembly rotates, renders an untenable moment arm to which it must overcome. An invention by Robert Lee (U.S. Pat. No. 3,572,758) teaches of a combination luggage carrier and exercise stand. Lee was not concerned with saving weight, but rather with creating utility out of the bicycle when it was parked, by making it into an exercise machine. Being used as an exercise stand requires the platform to be larger, or to expand, but most importantly requires the stand to be made of materials that are sufficiently heavy and strong so as to support the weight of a person. In contrast, the multi-function bicycle component presented in this invention is light weight so as to not inhibit the general use of the bicycle as a bicycle.

SUMMARY

It is the objective of this invention to define a multi-function bicycle component which combines two or more of the following bicycle components; cargo rack, kickstand, fender, and repair stand, and when used with a folding bicycle, the additional components of a folding assist stand, and a stand to hold the folding bicycle in the folded position. Each of these components requires fastening members such as stays to hold the component on the bicycle. Traditionally, when multiple components are installed on a bicycle, there is a redundancy of fastening members. The present invention, by providing the utility of multiple components in a single component, serves to save weight and cost over each component installed separately. The multi-function bicycle component is rotatable relative to the bicycle frame at or near the wheel axis and comprises rotation preventing means which fasten it to the bicycle frame in a riding position.

BRIEF DESCRIPTION OF THE DRAWINGS

Referring now to the attached drawings which form a part of this original disclosure:

FIG. 1 is the first of a sequence of three figures showing the method of operation of rotating the multi-function bicycle component from the cargo rack position to the kickstand position.

FIG. 2 is the second of a sequence of three figures showing the method of operation of rotating the multi-function bicycle component from the cargo rack position to the kickstand position.

FIG. 3 is the third of a sequence of three figures showing the method of operation of rotating the multi-function bicycle component from the cargo rack position to the kickstand position.

FIG. 4 is the first of a sequence of four figures showing the method of operation of fastener latch 9 which serves to fasten the multi-function bicycle component in the riding position.

FIG. 5 is the second of a sequence of four figures showing the method of operation of fastener latch 9 which serves to fasten the multi-function bicycle component in the riding position.

FIG. 6 is the third of a sequence of four figures showing the method of operation of fastener latch 9 which serves to fasten the multi-function bicycle component in the riding position.

FIG. 7 is the fourth of a sequence of four figures showing the method of operation of fastener latch 9 which serves to fasten the multi-function bicycle component in the riding position.

FIG. 8 is the first of a sequence of four figures showing a method of automatic fastening of the multi-part fastening assembly which serves to fasten the multi-function bicycle component in the riding position.

FIG. 9 is the second of a sequence of four figures showing a method of automatic fastening of the multi-part fastening assembly which serves to fasten the multi-function bicycle component in the riding position.

FIG. 10 is the third of a sequence of four figures showing a method of automatic fastening of the multi-part fastening assembly which serves to fasten the multi-function bicycle component in the riding position.

FIG. 11 is the fourth of a sequence of four figures showing a method of automatic fastening of the multi-part fastening assembly which serves to fasten the multi-function bicycle component in the riding position.

FIG. 20 is the first of a sequence of six figures showing the method of use of the multi-function bicycle component during the process of folding the folding bicycle.

FIG. 21 is the second of a sequence of six figures showing the method of use of the multi-function bicycle component during the process of folding the folding bicycle.

FIG. 22 is the third of a sequence of six figures showing the method of use of the multi-function bicycle component during the process of folding the folding bicycle.

FIG. 23 is the fourth of a sequence of six figures showing the method of use of the multi-function bicycle component during the process of folding the folding bicycle.

FIG. 24 is the fifth of a sequence of six figures showing the method of use of the multi-function bicycle component during the process of folding the folding bicycle.

FIG. 25 is the sixth of a sequence of six figures showing the method of use of the multi-function bicycle component during the process of folding the folding bicycle.

DETAILED DESCRIPTION OF THE EMBODIMENTS

The embodiments are set forth as follows with reference to the accompanying figures, wherein one numeral designates identical or corresponding elements throughout all figures.

Figure 1:
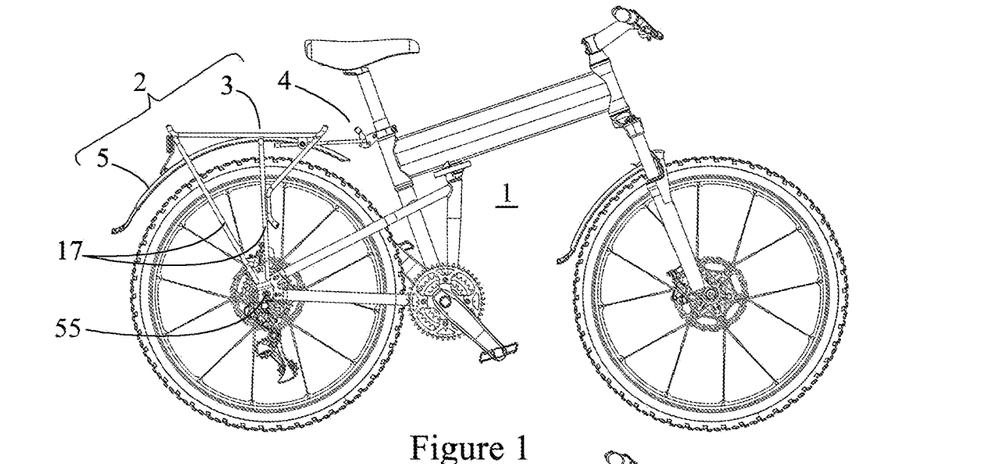
FIG. 1 is a side view of the complete bicycle 1 equipped with multi-function bicycle component 2 where the multi-function bicycle component is in the cargo rack position.
Figure 3:
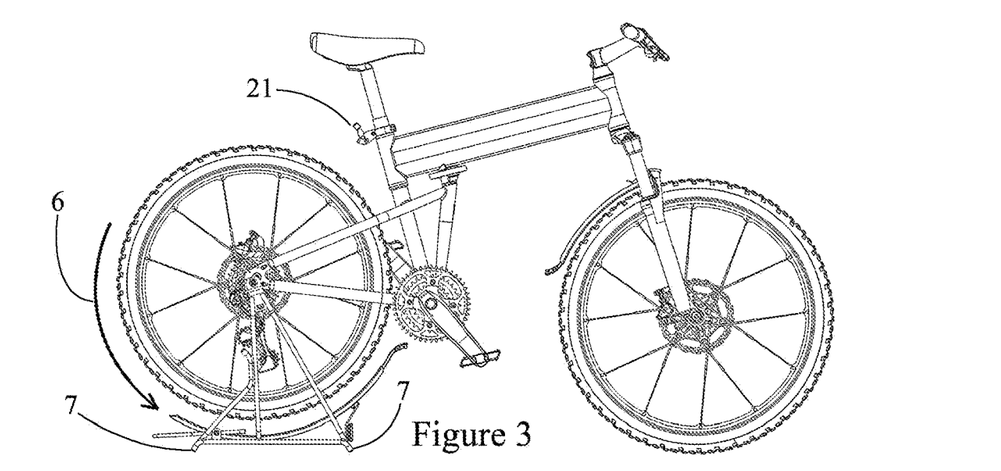
FIG. 3 is a side view of the complete bicycle 1 equipped with multi-function bicycle component 2 where the multi-function bicycle component has been rotated to the kickstand position.

This invention describes a multi-function bicycle component 2 which fastens to a bicycle 1 and which is rotatable relative to the bicycle to multiple positions to serve in a first position as a cargo rack (for example as shown in FIG. 1) and to serve in a second position as a bicycle parking stand (for example as shown in FIG. 3) and wherein the rotation occurs at or near the wheel axis; further comprising a multi-part fastening assembly 4, a first portion 21 which is fastened to the bicycle in a location other than at the wheel axis, and a second portion 12 which fastens to, or is part of, the multi-function bicycle component and wherein the first portion and the second portion join together to lock the multi-function bicycle component in an operative riding position. Multi-function bicycle component 2, in a first position as shown, for example, in FIG. 1, is generally positioned over the bicycle rear wheel. However, multi-function bicycle component 2, in a first position, may also be generally positioned over the bicycle front wheel (not shown). In the second position, multi-function bicycle component 2 may also serve as a repair stand as, for example, it may elevate the rear wheel off the ground allowing it to rotate freely for gear or brake adjustment and repair.

Figure 2:
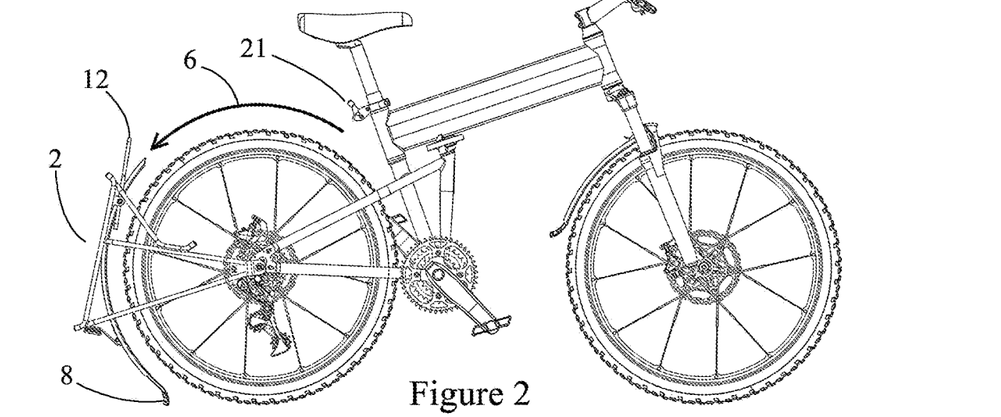
FIG. 2 is a side view of the complete bicycle 1 equipped with multi-function bicycle component 2 where the multi-function bicycle component is being rotated from the cargo rack position toward the kickstand position.

FIG. 1 is a side view of a bicycle 1 equipped with a multi-function bicycle component 2 which has a cargo support area 3 for transporting cargo/luggage when multi-function bicycle component 2 is in the riding position shown. The multi-function bicycle component 2 fastens to bicycle 1 using a multi-part fastening assembly 4, and a point of rotation fastening device 55 at a second location where relative rotation between the multi-function bicycle component 2 and bicycle 1 occurs. The multi-function bicycle component 2 may, or may not, be equipped with a fender 5 to take advantage of stays 17 as a form of mounting the fender. FIG. 2 demonstrates how multi-part fastening assembly 4 is first unlocked and then multi-function bicycle component 2 is rotated in the direction of rotation arrow 6 toward a stand position. FIG. 2 shows multi-part fastening assembly first portion 21 having been separated from multi-part fastening assembly second portion 12. Shown is impact absorber 8 which can serve to absorb the impact of the ground if and when multi-function bicycle component 2 first contacts the ground during rotation from a first position to a second position where impact absorber 8 impacts the ground. Impact absorber 8 can serve to protect multi-function bicycle component 2 from damage during impact with the ground and can also serve as a tail on fender 5. FIG. 3 shows multi-function bicycle component 2 having followed rotation arrow 6 to a position where it serves as a kickstand to hold the bicycle in a generally upright position. Protrusions 7 which may be located at the extremities of cargo support area 3 may offer stabilization. In this way, multi-function bicycle component 2 comprises a cargo support area where cargo/luggage is placed when multi-function bicycle component 2 is in a first position, and wherein cargo support area 3 has protrusions 7 positioned at the extremities such that, when multi-function bicycle component 2 is rotated to a second position, the protrusions contact the ground and act to stabilize multi-function bicycle component 2 and bicycle 1 in the parking position. Not shown but apparent to those skilled in the trade is a multi-function bicycle component 2 mounted above the front wheel which rotates from the cargo carrier position to the stand position. The assembly is shown fastening to the seat tube, but it will be apparent to those skilled in the trade that it can also fasten to other bicycle components or members such as the seat stays or other members that are not at or near the point of rotation.

Figures 4, 5:
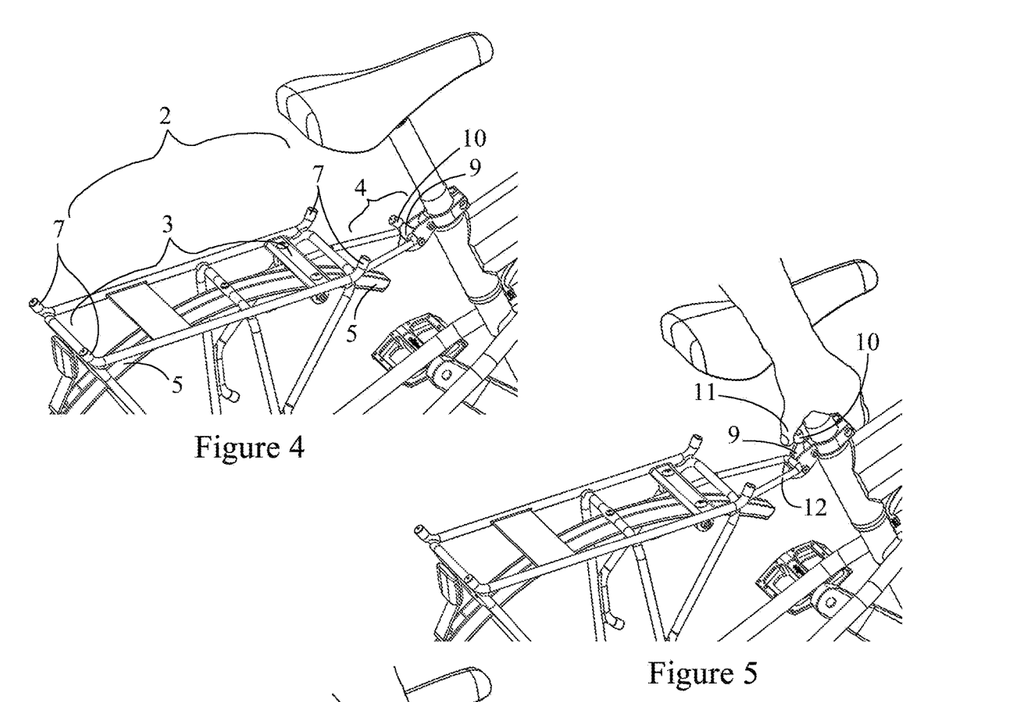
FIG. 4 is a perspective view of a portion of a bicycle equipped with multi-function bicycle component 2 where the multi-function bicycle component is in the cargo rack position and multi-part fastening assembly fastener latch 9 is closed for riding.
FIG. 5 is a perspective view of a portion of a bicycle equipped with multi-function bicycle component 2 where the multi-function bicycle component is in the cargo rack position and multi-part fastening assembly fastener latch 9 is being manually held open.
Figures 6, 7:
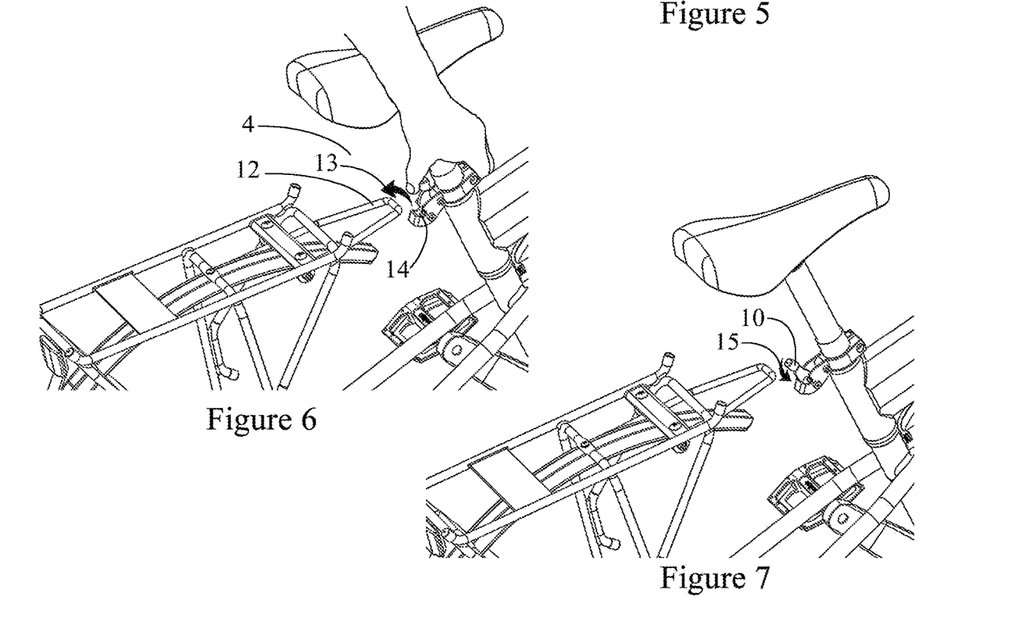
FIG. 6 is a perspective view of a portion of a bicycle equipped with multi-function bicycle component 2 where the multi-function bicycle component has just begun rotation out of the cargo rack position and multi-part fastening assembly fastener latch 9 is being manually held open.
FIG. 7 is a perspective view of a portion of a bicycle equipped with multi-function bicycle component 2 where the multi-function bicycle component has just begun rotation out of the cargo rack position and multi-part fastening assembly fastener latch 9 has been released allowing it to move to its biased closed position.

The sequence shown in FIGS. 4-7 shows a multi-part fastening assembly 4 configured to require that multi-part fastening assembly 4 be held manually disengaged during at least the first portion of rotation of multi-function bicycle component 2 from a first position as a cargo rack to a second position as a stand. FIG. 4 shows detail of the multi-function bicycle component 2 with protrusions 7 shown as example at the extremities of cargo support area 3. Multi-part fastening assembly 4 is shown with fastener latch 9 and fastener lever 10 being in the locked riding position. Also shown is optional fender 5. FIG. 5 shows fastener lever 10 being manually disengaged by finger 11 causing fastener latch 9 to allow multi-part fastener assembly second portion 12 to be released. FIG. 6 shows multi-part fastening assembly 4 held manually disengaged and multi-part fastener assembly second portion 12 having exited fastener receptor 14 in the direction of arrow 13. FIG. 7 shows fastener lever 10 having been released and biasing back to a closed position in the direction of arrow 15. Not shown but apparent to those skilled in the trade is multi-part fastening assembly 4 configured to be releasable by an action prior to the start of rotation of multi-function bicycle component 2 and not requiring held manual disengagement during at last the start of rotation of multi-function bicycle component 2. Also not shown but which will be apparent to those skilled in the trade is a two part fastening assembly with a primary lock and a secondary retention which replace the single fastening systems shown throughout this disclosure.

Figures 8, 9:
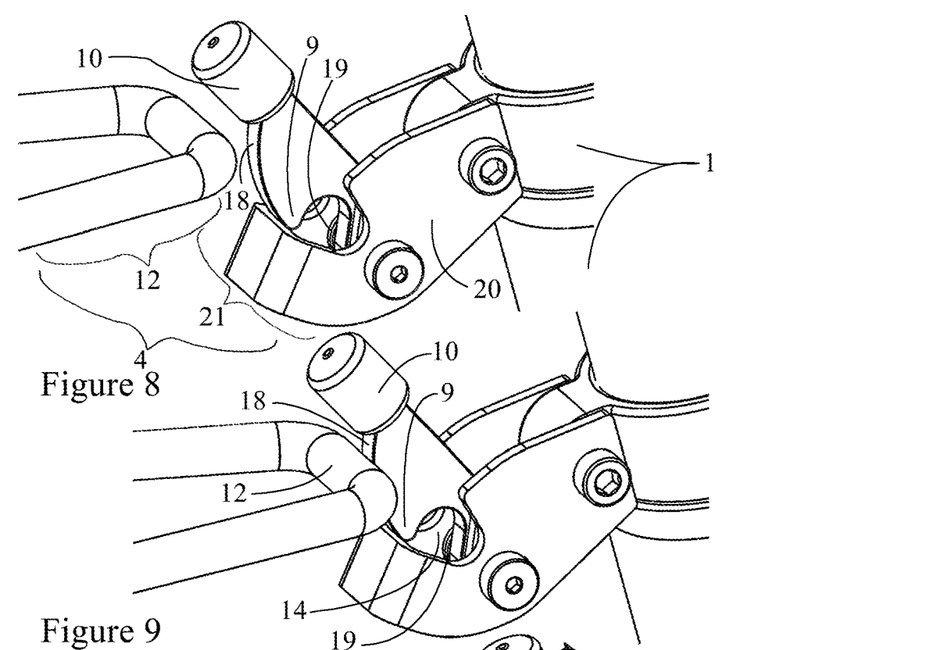
FIG. 8 is a perspective view of multi-part fastening assembly 4 where multi-function bicycle component 2 is rotating toward the riding position and the fastening of the multi-part fastening assembly but is not yet engaged and fastened for riding.
FIG. 9 is a perspective view of multi-part fastening assembly 4 where multi-function bicycle component 2 is rotating toward the riding position and the fastening of the multi-part fastening assembly and is just touching the fastener latch but is not yet fastened for riding.
Figure 10:
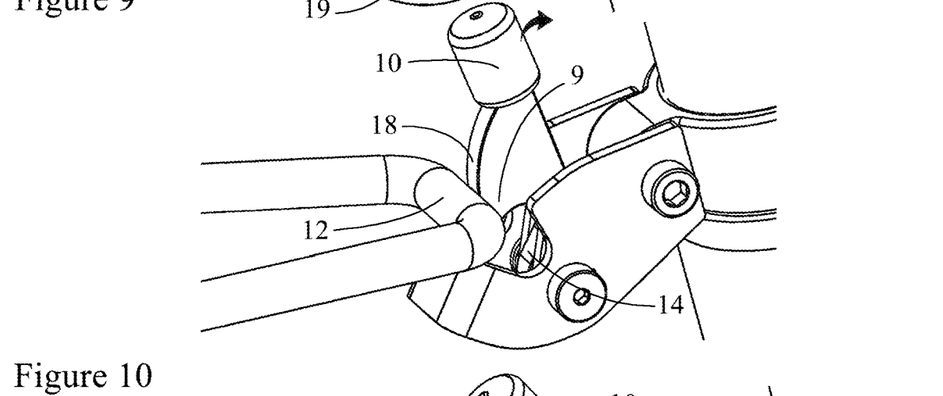
FIG. 10 is a perspective view of multi-part fastening assembly 4 where the multi-function bicycle component 4 is rotating toward the riding position and the fastening of the multi-part fastening assembly and is pushing the biased fastener latch toward an open position but the fastener latch is not yet fastened for riding.
Figure 11:
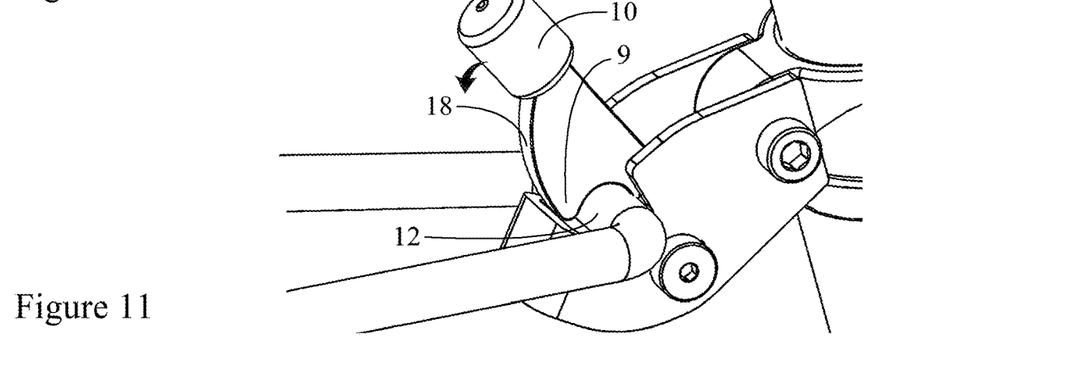
FIG. 11 is a perspective view of multi-part fastening assembly 4 where the multi-function bicycle component 2 has finished rotating toward the fastening of the multi-part fastening assembly and the fastener latch has automatically fastened for riding.

FIGS. 8-11 show a method of locking multi-part fastening assembly 4 during rotation of multi-function bicycle component 2 from a stand position to the cargo carrier position where the first portion 21 and the second portion 12 of the multi-part fastening assembly 4 automatically join together to lock multi-function bicycle component 2 in an operative riding position. FIG. 8 shows a close up of multi-part fastening assembly 4 with multi-part fastener assembly second portion 12 approaching automatic engagement surface 18 on fastener latch 9. In this embodiment, during the rotation of multi-function bicycle component 2 to the cargo carrier and riding position, manual operation of fastener lever 10 is not required. Fastener latch 9 and fastener lever 10 are biased to the closed position by spring 19. In FIG. 9, multi-part fastener assembly second portion 12 has contacted automatic engagement surface 18 but has not yet caused fastener latch 9 to open. FIG. 10 shows multi-part fastener assembly second portion 12 pushing on automatic engagement surface 18 and causing fastener latch 9 and fastener lever 10 to move against spring 19 to begin to allow multi-part fastener assembly second portion 12 to enter fastener receptor 14. Finally, FIG. 11 shows multi-part fastener assembly second portion 12 having entered fastener receptor 14 and fastener latch 9 having moved due to spring 19 to automatically fasten the multi-part fastening assembly 4 together in the operative riding position. In this way, a first portion (multi-part fastener assembly first portion 21) and a second portion (multi-part fastening assembly second portion 12) of the multi-part fastening assembly 4 automatically join together to lock the multi-function bicycle component 2 in an operative riding position. Not show, but apparent to those skilled in the trade is a multi-part fastening assembly 4 with a first portion 21 and a second portion 12 which require manual operation in order to join together to lock the multi-function bicycle component 2 in an operative riding position. The multi-part fastening assembly 4 is shown with a first portion 21 fastened to bicycle 1 at or near the bicycle seat tube, but it may also be fastened elsewhere on the bicycle, other than at the wheel axis. Also not shown but which will be apparent to those skilled in the trade are a wide variety of other configurations for multi-part fastening assembly 4 which serve to fasten multi-function bicycle component 2 in the riding position.

Figure 12:
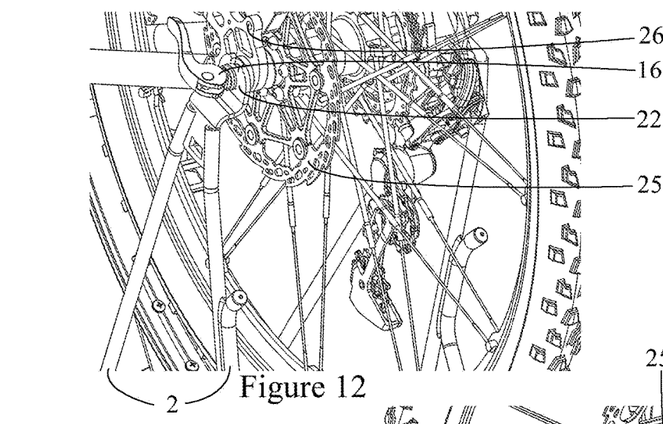
FIG. 12 is a perspective view of the left side of the bicycle rear wheel where the multi-function bicycle component can fasten and rotate about the rear wheel manually operated retention system. The multi-function bicycle component is shown in a stand position.
Figure 13:
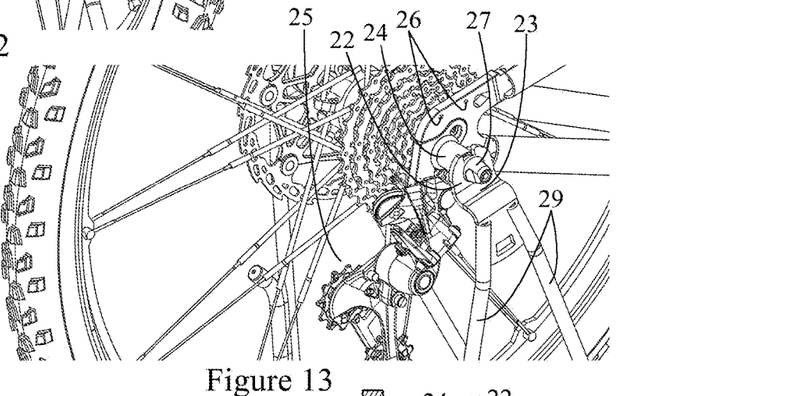
FIG. 13 is a perspective view of the right side of the bicycle rear wheel where the multi-function bicycle component can fasten and rotate about the rear wheel manually operated retention system. The multi-function bicycle component is shown in a stand position.
Figures 16, 17:
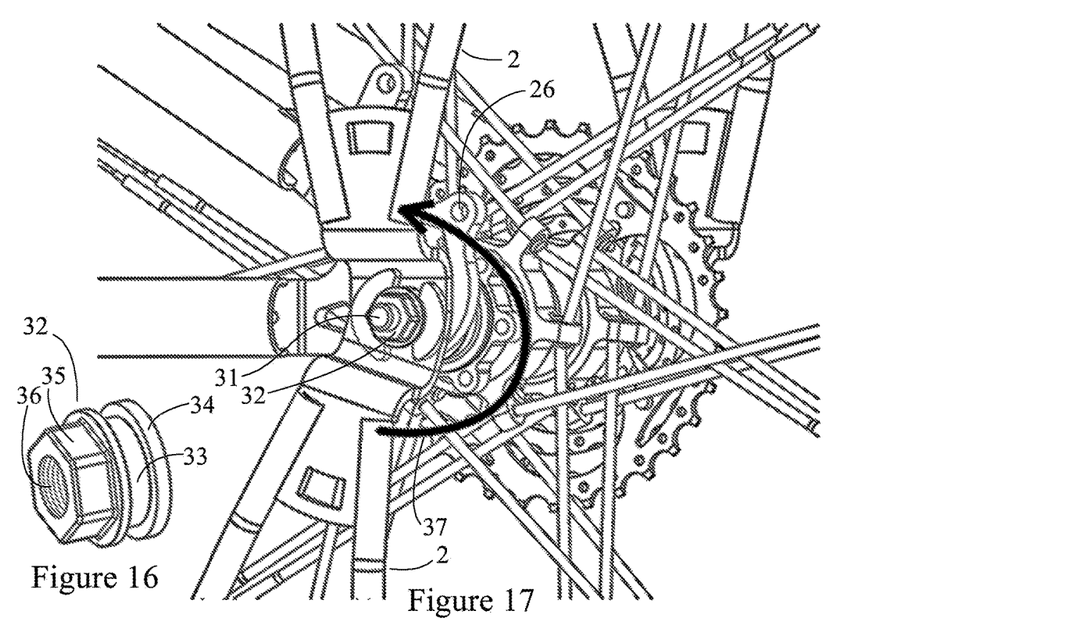
FIG. 16 is a perspective view of a tool operated fastening device for retention of the wheel and the multi-function bicycle component.
FIG. 17 is a perspective view of the middle of the rear wheel with a tool operated fastening device and the multi-function bicycle component shown moving from a stand position to the cargo rack position.
Figure 18:
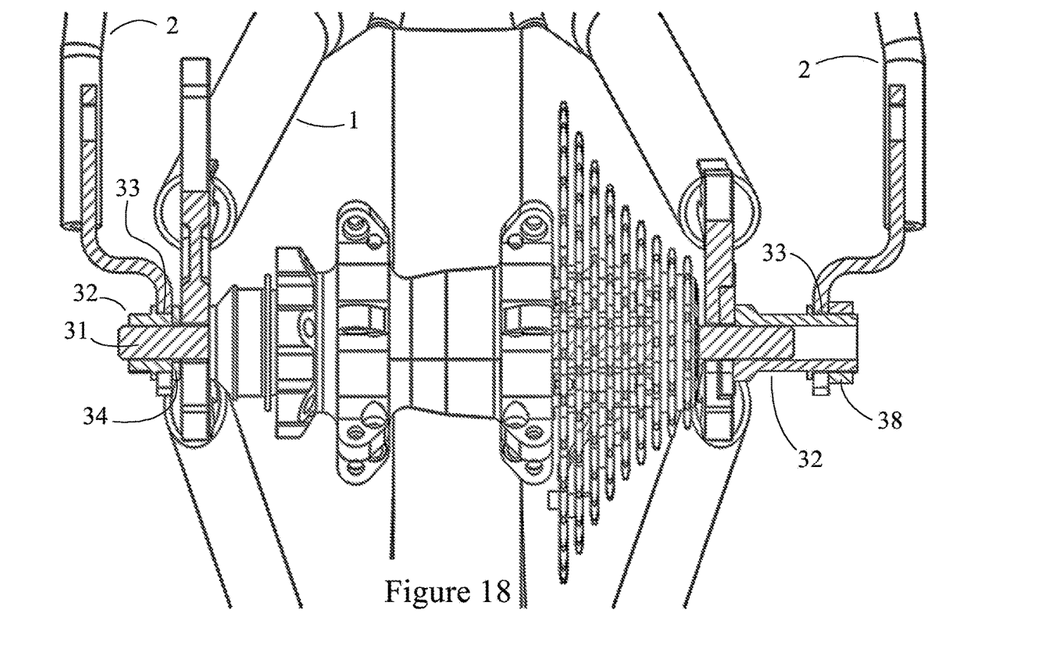
FIG. 18 is a section view looking forward through the center of the rear wheel equipped with a tool operated fastening device however the wheel assembly is shown in perspective for clarity.

FIGS. 12-18 show the rotation fastening point where multi-function bicycle component 2 rotationally fastens to bicycle 1 using point of rotation fastening device 55. This fastening point may be at or near the rotational axis of the rear wheel, or at or near the rotational axis of the front wheel. An example of a location near the axis of the rear wheel is axis location 26. FIGS. 12-15 show a manually operated point of rotation fastening device while FIGS. 16-18 show a tool operated point of rotation fastening device. FIG. 12 shows the multi-function bicycle component 2 where rotation occurs at the rear wheel axis about a manually operated fastening device 16. In this case, manually operated fastening device 16 serves to fasten both the bicycle wheel and the multi-function bicycle component 2 to bicycle 1. The manually operated fastening device 16 shown is a cam quick release which is a well known structure, and will therefore not be described in detail herein. Multi-function bicycle component 2 is shown in a stand position, in front of other bicycle component 25 (shown is a disc brake but may be a number of other bicycle components). FIG. 13 shows the opposite side of the rear wheel from FIG. 12 with multi-function bicycle component 2 in the stand position. A other bicycle component 25 (shown as a derailleur, but may be a number of other bicycle components) protrudes out to the side of the wheel and therefore rotation member 22 with offset 23 and stays 29 may be configured to allow for rotation of the multi-function bicycle component 2 without contacting other bicycle component 25. Assisting in this effort is spacer 24 which may position rotation member 22 further outboard away from the center plane of the bicycle allowing for additional clearance between stays 29 and other bicycle component 25. It is not required that offset 23 on one side of the wheel is equal in size to offset 23 on the opposite side of the bicycle and therefore rotation members 22 and stays 29 may be configured to be asymmetrical relative to the centerline of bicycle 1, along the direction of movement of the bicycle. Likewise, spacer 24 may be larger on one side of the bicycle than the opposite side in order to allow stays 29 sufficient clearance to pass a other bicycle component 25 during rotation. Manually operated fastening device element 27 serves to rotationally fasten multi-function bicycle component 2 to bicycle 1. Rotation of multi-function bicycle component 2 may occur at or near the wheel axis. Shown is an example of two axis locations 26 near the wheel axis which could serve as the axis of rotation. As is represented by the visible slot (see FIG. 19 rotation member slot 43) in rotation member 22, rotation member 22 may be configured to allow for multi-function bicycle component 2 to be removed from bicycle 1 by hand, without the use of tools.

Figures 14, 15:
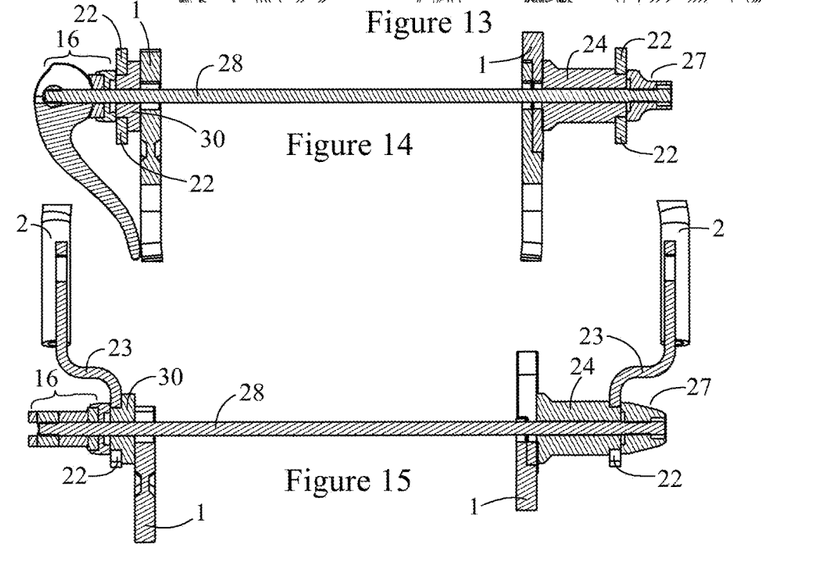
FIG. 14 is a section view through a wheel manually operated fastening device with the wheel not showing for clarity. The section is shown at an angle approximately ninety degrees from the section shown in FIG. 15.
FIG. 15 is a section view through a wheel manually operated fastening device with the wheel not showing for clarity. The section is shown at an angle approximately ninety degrees from the section shown in FIG. 14.

FIG. 14 is a cross section of the assembly through the center of fastening device skewer 28 oriented through the centerline of the lever of manually operated fastening device 16. Omitted from FIG. 14 for clarity is the bicycle hub and wheel assembly. As shown, manually operated fastening device 16 and element 27 serve to capture rotation members 22 against spacer 24 and second spacer 30 with a tolerance that allows rotation member 22 to rotate, but not move laterally (right or left in FIG. 14). When manually operated fastening device 16 is released, rotation member 22 is able to move laterally on each side away from the center of the wheel, at which point rotation member 22 is able to be removed from spacer 24 and second spacer 30 because of the narrow section of spacer 24 and second spacer 30 fits through slot 43 in rotation member 22. FIG. 15 is a cross section of the assembly through the center of fastening device skewer 28 rotated approximately ninety degrees from the section shown in FIG. 14. It should be noted that the ends of rotation member 22 do not show cross hatching as the section is taken through slot 43 in rotation member 22. Shown clearly in FIG. 15 is the optional asymmetrical assembly of multi-function bicycle component 2 due to spacer 24 being a different dimension from second spacer 30. Offsets 23 on each side are shown as mirror images of one another but could be made to be different from each other in order to accommodate different other bicycle components 25. Not shown but which will be apparent to those skilled in the trade are a wide variety of configurations for rotationally fastening multi-function bicycle component 2 to bicycle 1 that vary in structure from the examples illustrated, but which serve the same function.

There are several common methods of fastening wheels to bicycles and it will be apparent to those skilled in the trade that the present invention may be configured to be compatible with all. For example, FIGS. 12-15 show an embodiment which utilizes a manually operated fastening device 16 to rotationally fasten multi-function bicycle component 2 to bicycle 1. FIGS. 16-18 show a tool operated fastening device 32 which is interchangeable on all embodiments with the manually operated fastening device 16, and where rotation of multi-function bicycle component 2 occurs at the wheel axis about tool operated fastening device 32. FIG. 16 and FIG. 17 show one type of tool operated fastening device 32 which uses threading 36 to mount onto axle 31 using a tool on tool operation surface 35. FIG. 17 shows multi-function bicycle component 2 in both the cargo rack and stand positions. Tool operated fastening devices can also be mounted to bicycle 1 in a location other than axle 31 such as axis location 26. Multi-function bicycle component 2 rotates following rotation arrow 37 on rotation surface 33 which is outboard of spacer 34. FIG. 18 is a section view through the center of the rear wheel equipped with a different tool operated fastening device 32, however the wheel hub assembly is shown in perspective for clarity. On the left side, tool operated fastening device 32 is threaded onto axle 31 and bottoms out on spacer 34 to hold multi-function bicycle component 2 in place with just enough lateral (side to side) clearance to allow for rotation on rotation surface 33. On the right side, in this case, there is a other bicycle component 25 (not shown) which requires a different configuration of tool operated fastening device 32 which holds multi-function bicycle component 2 and rotation surface 33 further outboard (further to the right in FIG. 18). Retaining nut 38 holds multi-function bicycle component 2 in place. It will be apparent to those skilled in the trade that there are a wide variety of configurations for rotationally fastening multi-function bicycle component 2 to bicycle 1 and the examples set forth in the figures are a subset of those claimed.

Figure 19:
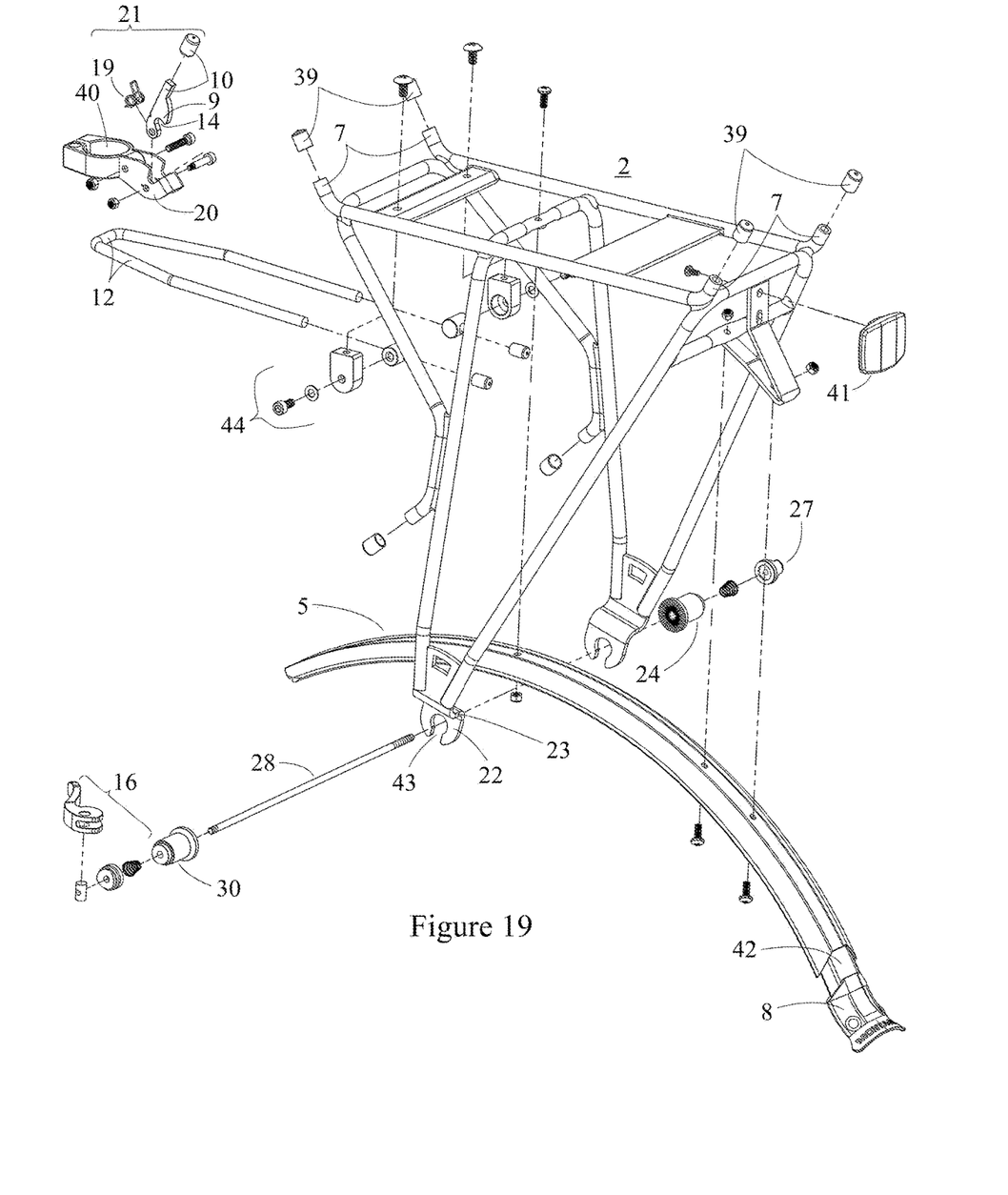
FIG. 19 is an exploded view of the multi-function bicycle component including manually operated retention system, multi-part fastening assembly, and fender.

FIG. 19 is an exploded view of a multi-function bicycle component 2 including manually operated fastening device 16, multi-part fastening assembly 4, and fender 5. Protrusions 7 have protrusion caps 39 shown which may serve to stabilize the bicycle during parking, and may be made of a material such as rubber which resists sliding. In the illustrated embodiment, clamp 40 adjustably fastens multi-part fastening assembly first portion 21 to bicycle 1 and fastening assembly 44 is one method of adjustably fastening multi-part fastening assembly second portion 12 to multi-function bicycle component 2. Not shown but apparent to those skilled in the trade is multi-part fastening assembly first portion 21 configured with a fastening means other than clamp 40 which is configured to fasten to other elements of bicycle 1 such as the seat stays (not shown). Fender 5 is shown configured with impact absorber 8 mounted to adjuster 42. Not shown but which will be apparent to those skilled in the trade are a wide variety of other configurations for multi-function bicycle component 2 that offer the same function, but have different construction.

Figures 20, 21, 22:
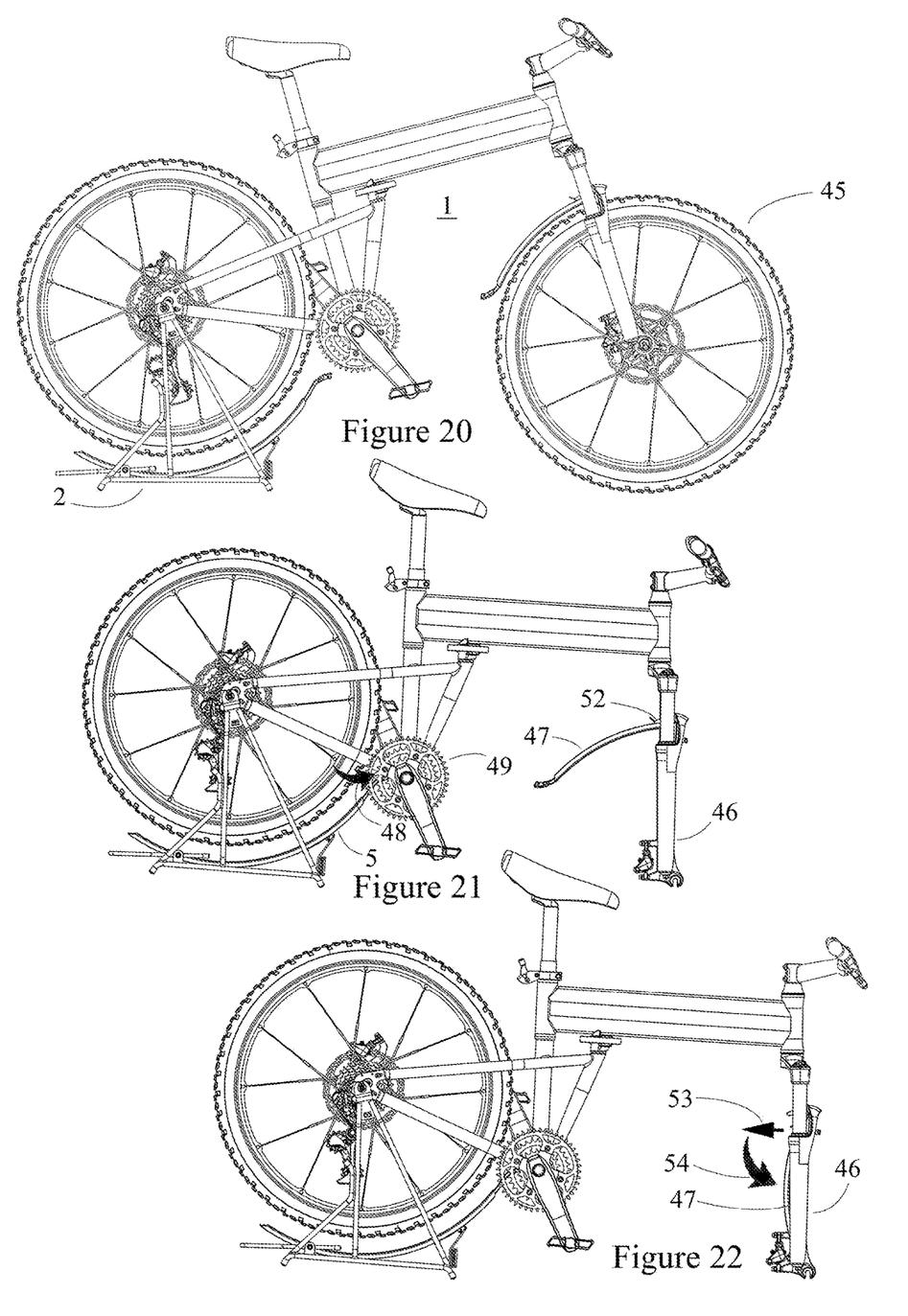
FIG. 20 is a side view of a folding bicycle 1 with the multi-function bicycle component in a kickstand position.
FIG. 21 is a side view of a folding bicycle 1 with the multi-function bicycle component in a stand position and the front wheel of the folding bicycle having been removed.
FIG. 22 is a side view of a folding bicycle 1 with the multi-function bicycle component in a stand position and the front wheel of the folding bicycle having been removed and the front fender being folded to a position approximately parallel with the wheel mount.
Figure 23:
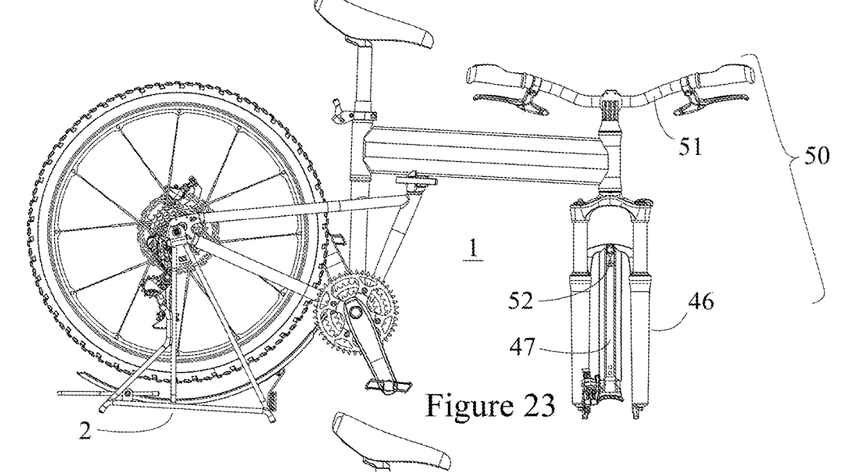
FIG. 23 is a side view of a folding bicycle 1 with the multi-function bicycle component in a stand position and the front wheel of the folding bicycle having been removed and the front fender having been folded to a position approximately parallel with the wheel mount, and the front steering assembly having been rotated such that the handlebar is approximately parallel to the bicycle frame.
Figure 24:
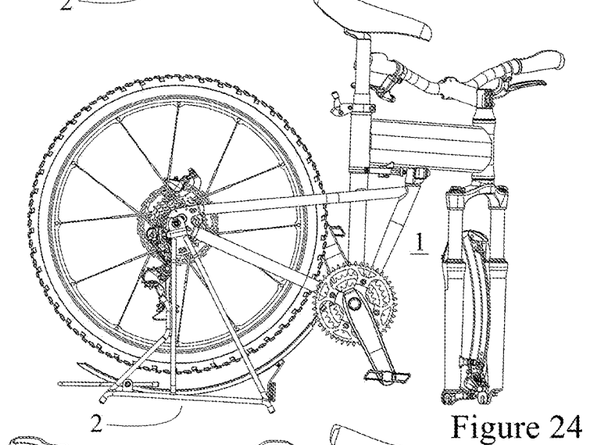
FIG. 24 is a side view of a folding bicycle 1 with the multi-function bicycle component in a stand position and the folding bicycle being partially folded.
Figure 25:
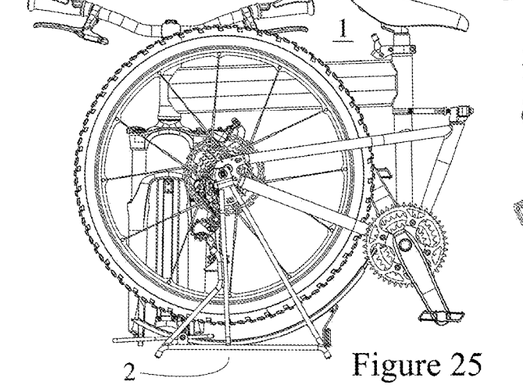
FIG. 25 is a side view of a folding bicycle 1 with the multi-function bicycle component in a stand position and the folding bicycle being fully folded.

The multi-function bicycle component 2 can be used with a wide variety of bicycles, including folding bicycles with a variety of designs and wheel sizes, one of which is set forth in the figures. For example, FIGS. 20-26 show a multi-function bicycle component 2 which fastens to a folding bicycle 1 and which is rotatable relative to folding bicycle 1 to multiple positions to serve in a first position as a cargo rack (as shown in FIG. 1) and to serve in a second position as a stand to hold folding bicycle 1 relative to the ground when in the folded position (as shown in FIG. 25). The multi-function bicycle component 2 may also serve as a folding-assist stand to hold folding bicycle 1 relative to the ground in a manner so as to stabilize the bicycle and assist the operator during at least part of the folding process. The multi-function bicycle component 2 may also serve as a bicycle parking stand when the folding bicycle is in the unfolded, ride-able position. FIGS. 20-25 show a sequence of folding the folding bicycle whereby multi-function bicycle component 2 serves as a stand to assist the user by supporting folding bicycle 1 relative to the ground during at least part of the folding and it serves as a parking stand to support folding bicycle 1 relative to the ground when folding bicycle 1 is in the folded position, and finally it serves to prevent multi-function bicycle component 2 from further rotation at a position desired for storage of folding bicycle 1 in the folded position. The figures show multi-function bicycle component 2 positioned around the rear wheel however it will be apparent to those skilled in the trade that it could also be positioned around the front wheel. In FIG. 20, the folding bike is shown in the parking position before having been folded. Multi-function bicycle component 2 has been rotated to the kickstand position, and is holding bicycle 1 in a upright position with front wheel 45 still on the bicycle. FIG. 21 shows the optional removal of front wheel 45 from wheel mount 46 and bicycle 1 having tipped forward such that impact absorber 8 (hidden behind chainwheel 49) connected to fender 5 contacts bicycle 1 (also see FIG. 26) in the area of arrow 48. In this position, multi-function bicycle component 2 is still holding bicycle 1 in a generally upright position thereby assisting the operator.

Figure 26:
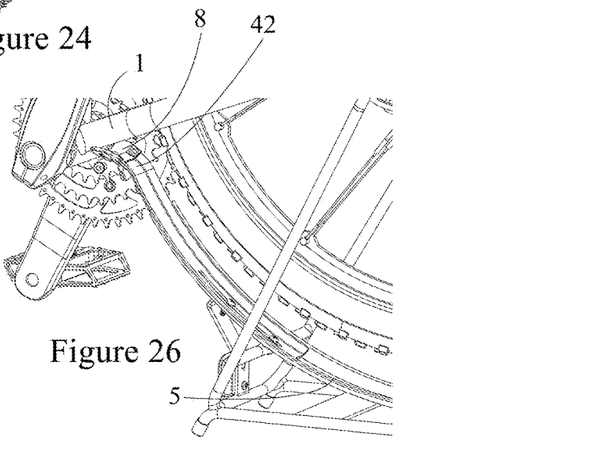
FIG. 26 is a perspective view of how the multi-function bicycle component stabilizes and supports the folding bicycle in the folded position.

If a bicycle is equipped with a rear fender, it is generally desirable to also include a front fender. There are a wide variety of bicycle fenders designed to be removable from the bicycle. However, fenders that are able to be folded out of the way, bur remain attached to the bicycle, are less common. FIG. 22 shows one embodiment with front fender 47, fastened to hinge member 52, such that hinge member 52 functions to allow fender 47, with bicycle wheel 45 removed, to fold to a position desirable during storage. Bicycle 1 is fitted with wheel mount 46 wherein the position of front fender 47 desirable during storage is generally in line with bicycle wheel mount 46, and hinge member 52 can be configured for operation without the use of tools. Fender hinge member 52 may be configured for operation by first pulling fender 47 in a longitudinal direction along fender 47 in the direction of arrow 53, and then rotating fender 47 along arrow 54 to the desired storage position as shown in FIG. 22. It will be apparent to those skilled in the trade that other methods of folding fender 47 may also be used. FIG. 23 shows steering assembly 50 with wheel mount 46 and front fender 47 having been turned approximately 90 degrees such that handlebar 51 is generally parallel to the frame of bicycle 1. FIG. 24 shows the process of the folding of folding bicycle 1 having been started and multi-function bicycle component 2 continuing to support and hold bicycle 1 in a generally vertical position. Finally, FIG. 25 shows folding bicycle 1 in the folded position supported by multi-function bicycle component 2. One method of stopping further rotation of folding bicycle 1 relative to multi-function bicycle component 2 is to have impact absorber 8, mounted on adjuster 42 and fender 5 be adjusted to encounter bicycle 1 as shown in FIG. 26. In this way, the entire bicycle 1 may be supported on multi-function bicycle component 2 for convenient folded parking storage. It will be apparent to those skilled in the trade that multi-function bicycle component 2 may be used with a wide variety of folding bikes and a wide variety of methods in addition to those set forth herein.

In considering the breadth of the present invention, the terms "member," "portion," "component", "part" or "element" when used in the singular form can also be considered to include the plural form including multiple parts. The term "comprising" and its derivatives, when used is intended to specify the inclusion of the described elements, features, components or steps, but does not exclude other features, components or steps not described. The terms "hinging", and "folding" and their derivatives are used interchangeably and have the same meaning. The terms "locking", "latching", and "fastening" and their derivatives are used interchangeably and have the same meaning. The word "point" is sometimes used to designate a general location, and not necessarily a singular point in space. The terms "first", "second", etc. are not used to designate a particular order, and the inclusion of a "first" element does not indicate the inclusion of another element.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

The invention claimed is:

1. A multi-function bicycle component which fastens to a bicycle and which is rotatable relative to said bicycle to multiple positions to serve in a first position as a cargo rack and to serve in a second position as a bicycle parking stand and specifically not a stationary exercise bicycle stand and wherein said rotation occurs at or near the wheel axis; further comprising a multi-part fastening assembly, biased to a fastened position by a biasing element, a first portion of which is mounted to the bicycle in a location other than at the wheel axis, and a second portion of which is mounted to said multi-function bicycle component and wherein said first portion and said second portion join together to lock said multi-function bicycle component in an operative riding position.

2. A multi-function bicycle component of claim 1 wherein said first portion of said multipart fastening assembly is fastened to said bicycle at or near a bicycle seat tube.

3. A multi-function bicycle component of claim 1 wherein said rotation occurs at the wheel axis about a manually operated fastening device.

4. A multi-function bicycle component of claim 3 wherein said manually operated fastening device serves to fasten both a bicycle wheel and the multi-function bicycle component to a bicycle frame.

5. A multi-function bicycle component of claim 1 wherein said rotation occurs at the wheel axis about a tool operated fastening device.

6. A multi-function bicycle component of claim 1 wherein said first portion and said second portion of said multi-part fastening assembly automatically join together to lock said multifunction bicycle component in an operative riding position.

7. A multi-function bicycle component of claim 1 configured to allow for said multi-function bicycle component to be removed from said bicycle by hand, without the use of tools.

8. A multi-function bicycle component of claim 1 further comprising rotation members and stays wherein said rotation members and said stays are configured to be asymmetrical relative to the centerline of said bicycle, along the direction of movement of the bicycle.

9. A multi-function bicycle component of claim 1 further comprising a cargo support area where cargo is placed when said multi-function bicycle component is in said first position, and wherein said cargo support area has non-telescopically extending protrusions positioned at the extremities such that, when said multi-function bicycle component is rotated to said second position, said protrusions contact the ground and act to stabilize the multi-function bicycle component and said bicycle in the parking position.

10. A multi-function bicycle component of claim 1 further comprising a fender designed to absorb the impact of the ground when said multi-function bicycle component first contacts the ground during rotation from said first position to said second position.

11. A multi-function bicycle component of claim 1 further comprising a fender, wherein said fender is mounted to said multi-function bicycle component in an operable manner.

12. A multi-function bicycle component of claim 1 wherein said multi-part fastening assembly is configured to require the operation of being actively held manually disengaged during at least the first portion of said rotation of the multi-function bicycle component from said first position as the cargo rack to said second position as the stand.

13. A multi-function bicycle component of claim 1 wherein said bicycle is a folding bicycle and wherein said multi-function bicycle component serves as the stand to assist the user by supporting said folding bicycle relative to the ground during at least part of the folding of said folding bicycle.

14. A multi-function bicycle component of claim 1 wherein said bicycle is a folding bicycle and wherein said multi-function bicycle component serves as a parking stand to support said folding bicycle relative to the ground when said folding bicycle is in the folded position.

15. A multi-function bicycle component of claim 14 further comprising an element which serves to prevent said multi-function bicycle component from further rotation in said second position at a position desired for storage of said folding bicycle.

* * * * *